US006104316A

United States Patent [19]
Behr et al.

[11] Patent Number: 6,104,316
[45] Date of Patent: *Aug. 15, 2000

[54] COMPUTERIZED NAVIGATION SYSTEM

[75] Inventors: David A. Behr, Roselle; Randall B. Jones, Downers Grove, both of Ill.

[73] Assignee: Navigation Technologies Corporation, Rosemont, Ill.

[*] Notice: This patent is subject to a terminal disclaimer.

[21] Appl. No.: 09/150,412

[22] Filed: Sep. 9, 1998

Related U.S. Application Data

[63] Continuation of application No. 08/494,198, Jun. 23, 1995, Pat. No. 5,808,566, which is a continuation-in-part of application No. 08/265,094, Jun. 24, 1994, Pat. No. 5,543,789.

[51] Int. Cl.[7] .................................................. G08G 1/123

[52] U.S. Cl. ........................ 340/995; 340/988; 701/208; 701/211

[58] Field of Search ..................................... 340/995, 990, 340/991, 989, 993, 994, 928, 905, 988; 701/208, 211, 200, 209

[56] References Cited

U.S. PATENT DOCUMENTS

| | | |
|---|---|---|
| 4,301,506 | 11/1981 | Turco . |
| 4,311,876 | 1/1982 | Endo et al. .............................. 340/905 |
| 4,428,057 | 1/1984 | Setliff et al. . |
| 4,466,125 | 8/1984 | Kanayama .............................. 340/990 |
| 4,481,584 | 11/1984 | Holland . |
| 4,546,439 | 10/1985 | Esparza .................................. 340/995 |
| 4,570,227 | 2/1986 | Tachi et al. . |
| 4,642,775 | 2/1987 | Cline et al. . |
| 4,713,661 | 12/1987 | Boone et al. .......................... 340/994 |
| 4,733,356 | 3/1988 | Haeussermann et al. .............. 340/988 |
| 4,758,959 | 7/1988 | Thoone et al. . |
| 4,780,717 | 10/1988 | Takanabe et al. ..................... 340/995 |
| 4,797,948 | 1/1989 | Milliorn et al. ....................... 340/991 |
| 4,812,843 | 3/1989 | Champion, III et al. ............. 340/905 |
| 4,951,212 | 8/1990 | Kurihara et al. ...................... 340/995 |
| 4,954,958 | 9/1990 | Savage et al. . |
| 4,974,170 | 11/1990 | Bouve et al. .......................... 395/357 |
| 5,043,902 | 8/1991 | Yokoyama et al. ................... 340/988 |
| 5,172,321 | 12/1992 | Ghaem et al. ........................ 364/444 |

(List continued on next page.)

FOREIGN PATENT DOCUMENTS

| | | |
|---|---|---|
| 0 379 198 A3 | 7/1990 | European Pat. Off. . |
| 3150699 | 6/1991 | Japan . |
| WO 92/14215 | 8/1992 | WIPO . |
| WO 92/21001 | 11/1992 | WIPO . |

OTHER PUBLICATIONS

Hoffman, Steve and Stewart, Charles, "Text-based Routing: An Affordable Way Ahead?", Proceedings of the IEEE-IEE Vehicle Nagivation & Information System Conference, Ottawa, Canada—VNIS 1993.

PCT—Notification of Transmittal of the International Search Report, dated Nov. 2, 1995, in International application No. PCT/US95/07859, Application Shields Enterprises, Inc.

"Smart cars. Smart Highways." Collier, W. Clay and Weiland, Richard J. *IEEE Spectrum*, Apr. 1994, pp. 27–33.

*Primary Examiner*—Brent A. Swarthout
*Attorney, Agent, or Firm*—Frank J. Kozak; Lawrence M. Kaplan

[57] ABSTRACT

The invention provides a method and system for providing route guidance information from a base unit to a remote unit in response to a request from the remote unit. The remote unit may be a mobile unit or a fixed unit. A query is formatted at the remote unit, the query including the request, and communicated from the remote unit to the base unit. The requested route guidance information is calculated at the base unit in response to the query, using a database located at the base unit. A response to the query is formatted at the base unit, the response including the route guidance information. The response is communicated from the base unit to the remote unit for display.

15 Claims, 3 Drawing Sheets

Microfiche Appendix Included
(3 Microfiche, 283 Pages)

U.S. PATENT DOCUMENTS

| | | | |
|---|---|---|---|
| 5,187,810 | 2/1993 | Yoneyama et al. | 340/991 |
| 5,214,757 | 5/1993 | Mauney et al. | 395/161 |
| 5,243,528 | 9/1993 | Lefebvre | 340/995 |
| 5,262,775 | 11/1993 | Tamai et al. | 340/995 |
| 5,283,575 | 2/1994 | Kao et al. | 340/990 |
| 5,289,572 | 2/1994 | Yano et al. | 395/155 |
| 5,291,412 | 3/1994 | Tamai et al. | 340/990 |
| 5,291,413 | 3/1994 | Tamai et al. | 340/990 |
| 5,293,163 | 3/1994 | Kakihara et al. | 340/988 |
| 5,293,484 | 3/1994 | Dabbs, III et al. | 340/825.44 |
| 5,396,429 | 3/1995 | Hanchett | 340/937 |
| 5,424,951 | 6/1995 | Nobe et al. | 364/443 |
| 5,543,789 | 8/1996 | Behr et al. | 340/995 |
| 5,550,873 | 8/1996 | Dolev et al. | 375/354 |
| 5,559,707 | 9/1996 | DeLorme et al. | 340/995 |
| 5,572,204 | 11/1996 | Timm et al. | 340/989 |
| 5,608,635 | 3/1997 | Tamai | 340/990 |

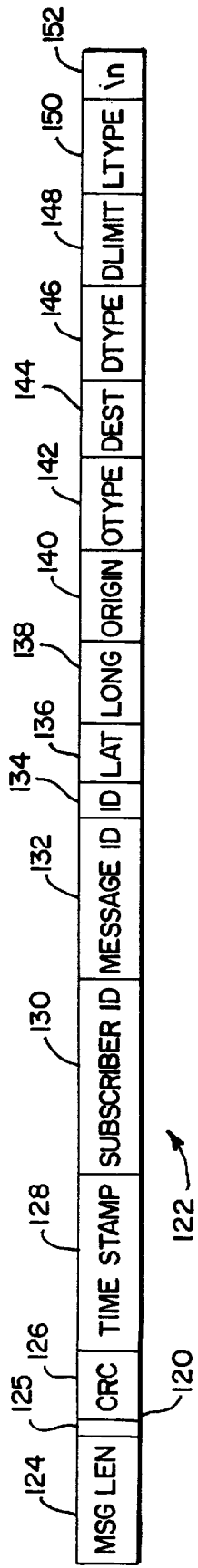
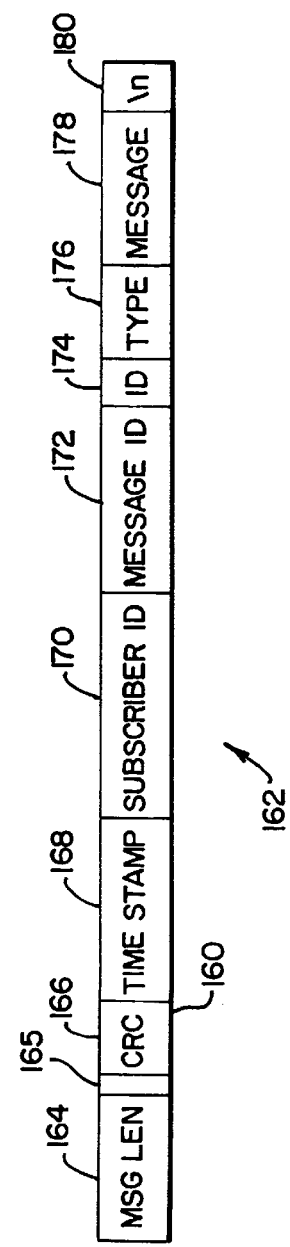
FIG. 3
FIG. 4

COMPUTERIZED NAVIGATION SYSTEM

REFERENCE TO RELATED APPLICATIONS

The present application is a continuation of Ser. No 08/494,198, filed Jun. 23, 1995, now U.S. Pat. No. 5,808,566, which was a continuation-in-part of Ser. No. 08/265,094, filed Jun. 24, 1994, now U.S. Pat. No. 5,543,789.

REFERENCE TO MICROFICHE APPENDIX

Included with this specification is a microfiche appendix including 3 sheets of 283 total frames.

BACKGROUND OF THE INVENTION

The invention generally relates to a system and method for providing route guidance and tracking information from a base unit to a mobile unit over wireless and wireline devices. The invention more particularly relates to an apparatus and method for providing to a mobile unit route guidance and tracking information which has been calculated at a base unit in response to a query from the mobile unit.

Systems have been developed which provide geographical or position-dependent information to a mobile user. Such systems are generally installed in an automobile or other vehicle. These systems generally include an on-board geographic database which may be accessed to determine geographic information, such as locations of points of interest, directions to points of interest, and directions between a specified origin and a destination. An on-board computer calculates route guidance information using data from the database in response to user inputs.

Such systems are known as autonomous route guidance systems, since they are independent and self-contained. The systems generally include a geographic database, positioning sensors, and a computer including a keyboard and display. The geographic database is a representation of a region or metropolitan area and may include, for example, street names, navigation attributes, such as turn restrictions and one-way streets, street addresses, and points of interest, such as airports, restaurants and museums. The positioning sensors may determine geographic position from RF (Radio Frequency) triangulation or in response to signals from, for example, GPS (Global Positioning System), LORAN C or other similar positioning systems, and from motion and direction detectors. The computer calculates route guidance information in response to inputs from the other system components as well as operator input. The route guidance information is provided to the user in the form of navigational text or map graphics.

Autonomous route guidance systems have many drawbacks, however, which have prevented their widespread use. Because the system is autonomous and has an on-board database, the system must include large storage capabilities for storing all the data which form the database. Technologies such as CD-ROM have allowed storage of an entire database but require still a tradeoff between cost and fast, efficient data access.

Another problem with the database provided with autonomous route guidance systems is maintenance or currency of the database. As new streets are built, or as old streets are reconfigured, as businesses and other points of interest open and close, the database on CD-ROM or other media becomes out of date. In addition, when a database is compiled, it may include errors which are then replicated in the many copies provided to users. These errors may require correction in the user copies by replacing those database copies. Moreover, incorrect or outdated information in the database can lead to errors when calculating routes. When an out-of-date database does not include the information that a particular roadway is closed, the system may be unable to calculate an alternate route.

Autonomous route guidance systems may improve the accuracy of the system by providing occasional database updates to users. However, distribution of the database, in a medium such as CD-ROM or floppy disk, to remotely located mobile users may be difficult. In addition, the media themselves are expensive since they may generally be used only a single time.

Other aspects of such prior art autonomous route guidance systems add to their cost and inconvenience. Because the systems are autonomous, they must include all components, including the computer, the database and the position sensor. Using present technology, such a system is too heavy and too large to be readily transported by an individual. In addition, the complete system has power requirements which make battery operation impractical. As a result, autonomous route guidance systems have been limited to installation in automobiles or other vehicles which can accommodate the size and power requirements of such a system. The current best price for a complete autonomous route guidance system is at least $2,000. This includes only the cost for a single, dedicated autonomous route guidance system.

Another type of route guidance system has been tested in Europe using beacons to provide a guidance signal to on-board equipment. The system directs the user to travel from beacon to beacon, creating a step-wise path between an origin and a destination. The navigational information thus provided forms a generally inefficient routing path from origin to destination. In addition, such a system does not provide the capability to query a database for information about nearby points of interest and other geographical information.

Therefore, there is a need for a routing and information system that continually provides access to up-to-date, correct geographic information by a remote user. There is a further need for a routing and information system which can be implemented on lightweight, portable devices for easy, convenient transportation and use. There is a further need for a routing and information system which is independent of any particular hardware configuration and may be implemented on any suitably equipped data processing apparatus, such as a desktop personal computer, a laptop computer, a personal digital assistant or even a pager. There is a further need for a routing and information system which provides communication between mobile units and a base unit over any available channel, including wireless and wireline channels. There is a still further need for a data communication protocol for providing accurate, reliable communication in such a system, independent of hardware configuration.

SUMMARY OF THE INVENTION

The invention therefore provides a method of providing route guidance information from a base unit to a mobile unit in response to a request from the mobile unit. The method comprises the steps of formatting a query at the mobile unit, the query including the request, communicating the query from the mobile unit to the base unit, and calculating the route guidance information at the base unit in response to the query. The method further comprises the steps of formatting a response to the query at the base unit, the response including the route guidance information, and communicating the response from the base unit to the mobile unit. The remote guidance information may include navigation instructions from an origin to a destination, information about one or more points of interest within the region of an origin or other geographically referenced information.

The invention further provides a system for communicating routing information between a base unit and a mobile unit. The system comprises input means at the mobile unit for providing an origin and a destination. The system further comprises calculating means at the base unit for calculating a route between the origin and the destination. The system still further comprises communication means for communicating the origin and the destination from the mobile unit to the base unit and for communicating the route from the base unit to the mobile unit. The routing information may include navigation instructions from an origin to a destination, information about one or more points of interest within the region of an origin or other geographically referenced information.

The invention still further provides a method of providing routing information to a mobile unit. The method comprises the steps of providing an origin and a destination from the mobile unit to a base unit, the base unit located remotely from the mobile unit. The method further comprises the steps of calculating at the base unit a route between the origin and the destination, and providing the route to the mobile unit.

The invention still further provides a system for providing route guidance information to a remote location from a central location. The system comprises a mobile unit including input means for providing at least a route destination and output means for providing an indication of the route guidance information. The system further comprises first transmission means at the mobile unit for transmitting destination data and origin data from the mobile unit, the destination data being indicative of a route destination and the origin data being indicative of a route origin. The system still further comprises a base unit at the central location. The base unit includes first receiving means for receiving the destination data and the origin data from the first transmission means, calculating means coupled with the receiving means for calculating a route to the route destination from a route origin responsive to the destination data and the origin data, and second transmission means for transmitting routing data, the routing data being indicative of the route. The system still further comprises second receiving means at the mobile unit for receiving the routing data from the second transmission means, the second receiving means being coupled with the output means for providing the route guidance information to the input means responsive to the routing data.

The invention provides a system and method for providing geographically referenced information from a base unit or server to a mobile unit. The mobile unit may be a transportable device such as a laptop computer or personal digital assistant (PDA), or may be a desktop personal computer or any other device permitting data entry and display or printing of the provided information.

The mobile unit communicates with the base unit using any available communication system, such as land line telephone link, cellular telephone or radio frequency transmission. Queries are communicated from the mobile unit to the base unit. The query requests route guidance information, information about a point of interest or other geographical information. The query is formatted in a specified protocol. The base unit communicates responses to queries, the responses also formatted in a specified protocol. The responses may include, for example, textual navigational directions or maneuver maps showing graphical representations of street intersections and the calculated route through the intersection. Transmitting only a representation of the intersection, rather than all geographical features around the intersection, allows the response, including the maneuver map, to be transmitted over a low bandwidth channel. The invention operates independently of the communication system and is adaptable to any system. The invention allows support for many different mobile unit platforms, taking advantage of each platform's capabilities while retaining as much system-level look and feel consistency as possible.

The base unit includes a geographical database, such as the Navigation Technologies Corp. navigable map database. The geographical database stores a variety of geographical and position-oriented attributes, such as street addresses, turn restrictions and points of interest. The points of interest are preferably organized according to different parameters, including point of interest type, such as "restaurant" or "museum;" point of interest name; city; driving distance; or driving time. The base unit further includes a server for receiving queries from one or more mobile units, resolving ambiguities in the queries, determining a response to the query, accessing the geographical database as needed. The server formats a response to the query and communicates the response to the mobile unit.

In a first mode of operation, an origin and a destination are entered at the mobile unit. The origin or the destination may be in the form of a street address, an intersection of two streets, or a point of interest previously identified in the geographical database. The origin and destination are communicated from the mobile unit to the base unit. The base unit calculates a route between the specified origin and destination. The routing information is communicated from the base unit to the mobile unit where it is displayed by the mobile unit. The display may be a graphical display, showing map portions and providing travel directions along with a display of highway signs and other information. The display may be textual information, providing travel directions. The mobile unit may supply a digitally synthesized voice which audibly presents the travel directions to the user.

In a second mode of operation, the mobile unit formulates a query requesting information about points of interest within a specified distance of an origin. The origin may be specified by street address, intersecting streets, by geographic position or by reference to a point of interest. The query is communicated from the mobile unit to the base unit. The base unit uses the geographical database to formulate a response. The response is communicated from the base unit to the mobile unit for display to the user.

In a third mode of operation, a mobile unit provides information specifying its location to the base unit. A control unit requests tracking information about the mobile unit from the base unit. The control unit may be, for example, another personal computer, coupled to the base unit through an external interface, either directly or through a communications network. The base unit provides to the control unit tracking information including the current location of the mobile unit with respect to the street network and the route covered by the mobile unit.

The invention further provides a protocol for communicating a query from the mobile unit to the base unit and for communicating a response from the base unit to the mobile unit. The protocol allows transmission of variable length messages, as required by the individual mobile unit or communication link. The protocol includes error checking, time stamping and subscriber information. The protocol further includes information specifying origin and destination, for a query, and message type and message contents, such as route information, for a response.

It is therefore an advantage of the invention to provide a method and apparatus for providing geographically referenced information from a base unit to a mobile unit, the mobile unit including only data entry and display devices and a communications link. It is a further advantage of the invention to provide this capability in a mobile unit which does not require on board database storage or position finding equipment at the mobile unit. It is a still further advantage of the invention to provide a mobile unit with access to a larger, more comprehensive database. For example, prior art CD-ROM-based databases are limited to 600 MB of storage which may be sufficient to store map information for only a single metropolitan region. In contrast, the invention allows the mobile unit to access map information for many metropolitan regions or an entire nation, as well as other information, such as on-line yellow page information or traffic advisory information, which may be provided by third party information providers. It is a still further advantage of the invention to permit automatic, real time database updates by maintaining the database only at the base unit, avoiding the need to distribute database updates to the mobile unit.

It is a still further advantage of the invention to provide a system for communicating requests for routing information and responses including routing information in which the system is independent of the devices on which the system is implemented. It is a further advantage of the invention to provide such a system which may be implemented using any commonly available hardware devices, including laptop computers, personal digital assistants and other transportable units communicating via wireless or wireline systems.

It is a still further advantage of the invention to efficiently convey complex information, including graphical information, over communication channels having limited bandwidth using data compression and a novel protocol. This allows a system in accordance with the invention to dynamically transmit selected map portions for display on a capable mobile unit. The geographical information may be saved at the mobile unit for later retrieval and display, without having to again access the base unit.

BRIEF DESCRIPTION OF THE DRAWINGS

The features of the invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 3 is a diagram illustrating a data communication protocol for communicating data from a mobile unit to a base unit in accordance with the invention and which may be used in conjunction with the system of FIG. 1 and the method of FIG. 2; and FIG. 4 is a diagram illustrating a data communication protocol for communicating data from a base unit to a mobile unit in accordance with the invention and which may be used in conjunction with the system of FIG. 1 and the method of FIG. 2.

DETAILED DESCRIPTION OF THE PREFERRED EMBODIMENT

Figure 1:
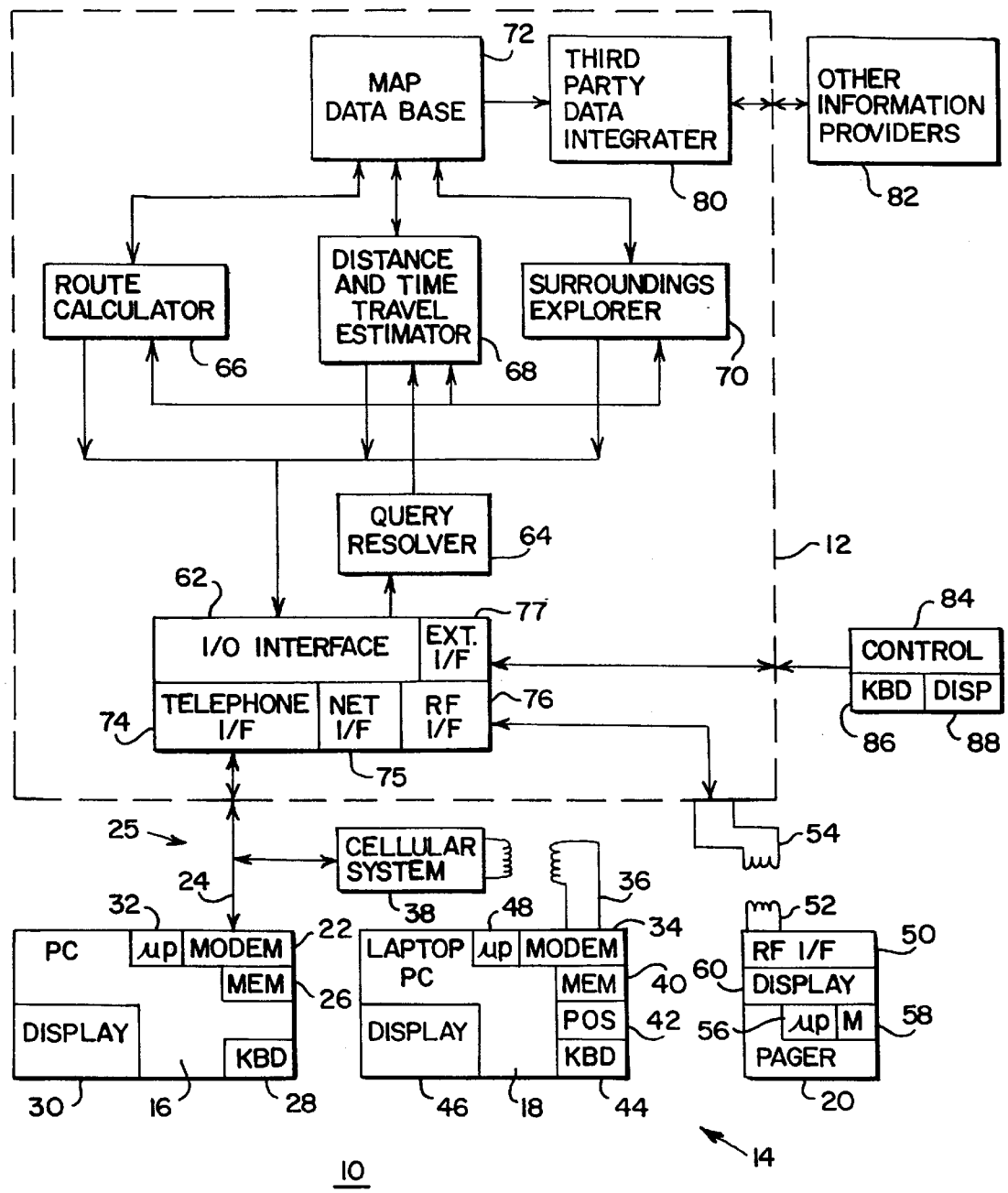
FIG. 1 is a functional block diagram illustrating the system of the invention.

FIG. 1 is a functional block diagram of a system 10 embodying the invention. The system 10 includes a base unit 12 and a plurality 14 of remote units arranged to communicate with the base unit 12. The plurality 14 of remote units may include, for example, a desktop personal computer 16, a laptop personal computer 18, or a pager 20. The plurality 14 of remote units may include any number of mobile units. The base unit 12 is preferably located at a single, central location. One remote unit may be permanently located at a single site, such as desktop personal computer 16. Another remote unit may also be mobile or transportable, such as laptop personal computer 18 or pager 20. As used herein, the term "mobile unit" includes both remote units which may be permanently located at a single site or remote units which are mobile or transportable.

The desktop personal computer 16 is an example of one type of mobile unit which may be included in the system 10. The desktop personal computer 16 preferably includes a modem 22, a memory 26, a keyboard 28, a display 30 and a microprocessor 32. The modem 22 is adapted to be coupled to a telephone line 24. The telephone line 24 is in turn coupled to the commercial telephone system 25. The modem 22 may be, for example, a serial (dial up line) modem such as a modem compatible with the AT command set which is built in to the desktop personal computer 16, a stand alone modem, or a PCMCIA modem. Alternatively, the modem may be for use with a specialty wireless transmission network such as ARDIS, CDPD (cellular digital packet data) or RAM. Still further, the modem may be of a type custom designed for the desktop personal computer 16. The modem 22 thus forms transmission means at the mobile unit for transmitting the origin and the destination and a receiving means at the mobile unit for receiving the responses, including the route, from the base unit 12.

The microprocessor 32 responds to program instructions and data stored in the memory 26. To activate the system 10, a user manipulates the keyboard 28 to formulate a request. The request may, for example, seek the route between an origin and a destination. The keyboard 28 thus provides an input means at the mobile unit for providing an origin and a destination. The desktop PC 16, under control of a program of instructions stored in the memory 26, conveys the request over the telephone line 24 to the base unit 12. The base unit 12 formulates a response to the request and conveys the response over the telephone line 24 to the desktop PC 16. The response to the request is displayed on the display 30. The display 30 thus forms an output means at the mobile unit for providing an indication of the route provided in the response. In addition, the response may be stored in the memory 26 for later retrieval and display. The memory 26 thus provides storage means at the mobile unit for storing the route communicated from the base unit.

The laptop personal computer 18 is another example of a mobile unit which may be used in the system 10. The laptop PC 18 includes a modem 34, a memory 40, a position locator 42, a keyboard 44, a display 46 and a microprocessor 48. The modem 34 is coupled to an antenna 36 for sending and receiving cellular telephone calls in conjunction with the cellular telephone system 38, which is a portion of the commercial telephone system 25. The modem 34 may be, for example, any of the modem types described in conjunction with the modem 22 of the desktop personal computer 16.

The microprocessor 48 operates in response to program instructions and data stored in the memory 40. The position locator 42 provides the geographical position of the laptop PC 18. For example, the position indicator 42 may perform RF (radio frequency) triangulation or may be responsive to GPS (Global Positioning System), LORAN C signals or other satellite positioning systems for providing latitude and longitude positioning information. The position locator 12 thus provides a position determining means for determining the geographical position of the mobile unit. The laptop PC 18, in response to the program instructions stored in the memory 40, provides a request over the commercial telephone system to the base unit 12. The request may be, for example, for the route between an origin and a destination. The origin may be specified either by manipulating the keyboard 44 or by providing the latitude and longitude information produced by the position locator 42. The base unit 12 provides a response to the request to the laptop PC 18. The response is displayed on the display 46.

The pager 20 provides another example of a remote unit which may be used with the system 10. The pager 20 includes a radio frequency (RF) interface 50 coupled to an antenna 52 for receiving RF signals from an antenna 54 coupled to the base unit 12. The pager 20 further includes a microprocessor 56 responsive to program instructions and data stored in a memory 58. In response to information transmitted from the base unit 12 and received at the antenna 52, the microprocessor 56 displays information, such as geographical directions, on a display 60.

In another mode of operation, one mobile unit, such as the desktop personal computer 16, may track another mobile unit, such as the laptop personal computer 18, using the system 10. A user of the desktop personal computer 16 may manipulate the keyboard 28 to request route guidance information such as tracking information. The request is transmitted over the telephone line 24 to the base unit 12. The base unit 12 formulates a response based on the geographic position information provided by the position locator 42 of the laptop PC 18. The response is transmitted over the telephone line 24 to the desktop personal computer 16 for display on the display 30.

Thus, the system 10 provides geo-referenced information over wireless and wireline devices to mobile and remote users. It is to be understood that the communications technologies and the mobile units illustrated in FIG. 1 may be combined in ways other than those illustrated in FIG. 1. For example, the desktop personal computer 16 may include an RF interface such as the RF interface 50 of the pager 20. Similarly, the modem 34 of the laptop PC 18 may be adapted for coupling directly to a telephone line such as telephone line 24.

In addition, other types of mobile units, such as personal digital assistants (PDAs) may be included in the system 10. Moreover, mobile units may access the base unit indirectly by communicating directly with a third-party information provider, such as Prodigy™, which in turn conveys queries to and responses from the base unit 12. In accordance with the invention, the system 10 operates independently of particular hardware configurations of the plurality 14 of remote units and of the communications system.

The base unit 12 includes an I/O interface 62, a query resolver 64, a route calculator 66, a distance and time travel estimator 68, a surroundings explorer 70, a map data base 72 and a third party data integrator 80. The I/O interface 62 includes a telephone interface 74 for coupling the base unit 12 to the commercial telephone system 25 including the telephone line 24. The I/O interface 62 further includes an RF interface 76 for coupling the base unit 12 with RF communication devices such as an antenna 54. The I/O interface 62 and the modem 22 thus provide communication means for communicating an origin and a destination from the desktop personal computer 16 to the base unit 12 and for communicating a route from the base unit 12 to the desktop personal computer 16. The I/O interface 62, the modem 34 and the antenna 36 provide a communication means for communicating the origin and the destination from the laptop personal computer 18 to the base unit 12 and for communicating the route from the base unit 12 to the laptop personal computer 18.

The I/O interface 62 may further include a network interface 75 for coupling the base unit 12 to one or more wireless or wireline communication networks such as CDPD (cellular digital packet data), TCP/IP (transmission control protocol/Internet protocol), ARDIS or RAM. The I/O interface 62 may further include an external interface 77 for coupling the base unit 12 to a control unit 84. The control unit 84 provides an external link to the base unit 12 and may be, for example, a personal computer coupled over a wireless or wireline network or a directly-connected terminal. The control unit 84 may include, for example, a keyboard 86 and a display 88. The control unit 84 may request tracking information about the location of one or more mobile units. For example, a mobile unit may be located in an armored vehicle transporting valuables along a specified route. The control unit may receive tracking information from the base unit and, if the mobile unit in the armored vehicle varies from the specified route by a predetermined amount, sounds an alarm or triggers some other action.

The I/O interface 62, including the telephone interface 74 and the RF interface 76, provide a means for coupling the base unit 12 with communications media such as the commercial telephone system and other wireline and wireless devices. The I/O interface 62 thus receives queries from the plurality 14 of remote units and transmits the responses from the base unit 12 to the plurality 14 of remote units. The I/O interface 62 therefore provides a receiving means at the base unit for receiving the origin and destination and a transmitting means at the base unit for transmitting the route to a mobile unit.

The query resolver 64 receives the request from the I/O interface 62. When a request is entered at one of the plurality 14 of remote units, a mistake may be made. For example, in manipulating the keyboard 44 of the laptop personal computer 18, the user may have entered "O'HAIR," intending to enter "O'HARE," indicating O'Hare Airport. Other ambiguities may be in the format of the address provided, in the latitude and longitude of the position provided, or in the definition of cross streets. The function of the query resolver 64 is to resolve such ambiguities in the query at the base unit 12 and convey the query for further processing.

If the query requested calculation of a route between an origin and a destination, the query is routed to the route calculator 66. In a manner well known in the art, the route calculator 66 determines a route between a specified origin and destination using the map database 72. The map database 72 may be, for example, the navigable map database maintained by Navigation Technologies Corp. The map database 72 preferably includes an accurate and complete representation of geographic information such as addresses, street names, navigation attributes (including turn restrictions, oneway streets, physical dividers, relative heights, freeway sign text, and so forth), as well as point of interest categories, such as parks, schools, hospitals, restaurants, and golf courses associated with the geographic information. In determining the route, the route calculator 66 preferably takes into account routing restrictions such as toll road avoidance, turn restrictions at a specified time of day, and others. Such routing restrictions may be specified by an operator at the base unit 10 in response to a temporary condition or may be added to the map database 72 when the restrictions become nationally available. The route calculator 66 thus forms a calculating means at the base unit for calculating a route between the origin and the destination. The map database may be divided into geographic areas such as metropolitan areas.

After a route has been calculated, the route is conveyed from the route calculator 66 to the I/O interface 62. The I/O interface 62 formats a response to the query. The response includes the route guidance information determined by the route calculator 66. The I/O interface 62 then communicates the response from the base unit 12 to the mobile unit which originally requested the information.

If the query requests a distance or a time of travel, the query is forwarded to the distance and time travel estimator 68. The distance and time travel estimator 68, in response to the query and using the map database 72, formulates a response to the query. The response is conveyed from the distance and time travel estimator 68 to the I/O interface 62. The response is formatted at the I/O interface 62 and communicated from the base unit 12 to the mobile unit which originally requested the information.

If the query requests information about points of interest in the area surrounding an origin, the query is conveyed to the surroundings explorer 70. The surroundings explorer 70 preferably provides an optimized method for searching for points of interest satisfying specified criteria or parameters such as time or distance. For example, the surroundings explorer 70 may locate all McDonald's™ restaurants within a specified driving distance or driving time of a specified origin, or it may locate the McDonald's™ restaurant nearest the specified origin. The origin and search parameters are specified in the query received from the mobile unit. In response to the query the surroundings explorer 70 accesses the map database 72 and searches outward from the specified origin. The surroundings explorer 70 analyzes paths in the map database 72 over which a mobile unit, in a car for example, could legitimately travel. The surroundings explorer 70 examines the associated point of interest information for entries satisfying the specified search parameters. The surroundings explorer 70 thus determines which points of interest satisfy the query. The information is conveyed from the surroundings explorer 70 to the I/O interface 62 and a response is formatted, the response including the information. The response is then communicated from the base unit 12 to the remote unit which requested the information.

The third party data integrator 80 provides additional data such as on-line yellow pages information or traffic advisory information for responding to queries from a mobile unit. The additional data are preferably received from other information providers, illustrated in FIG. 1 as functional block 82. The additional data may also be added directly to and located within the map database 72. The additional data may be supplied from external to the base unit 12 via any known data communications network.

The functions performed by the base unit 10, as described above and illustrated in the functional block diagram of FIG. 1, are preferably performed in a data processing system. The data processing system may be in one or more units and preferably includes a processor for executing program instructions, a memory for storage of the program instructions and data such as the map database 72. The data processing system further includes other equipment such as digital logic for implementing the I/O interface 62 for receiving queries and sending responses. The data processing system may include a display and a keyboard for providing an operator interface.

Figure 2:
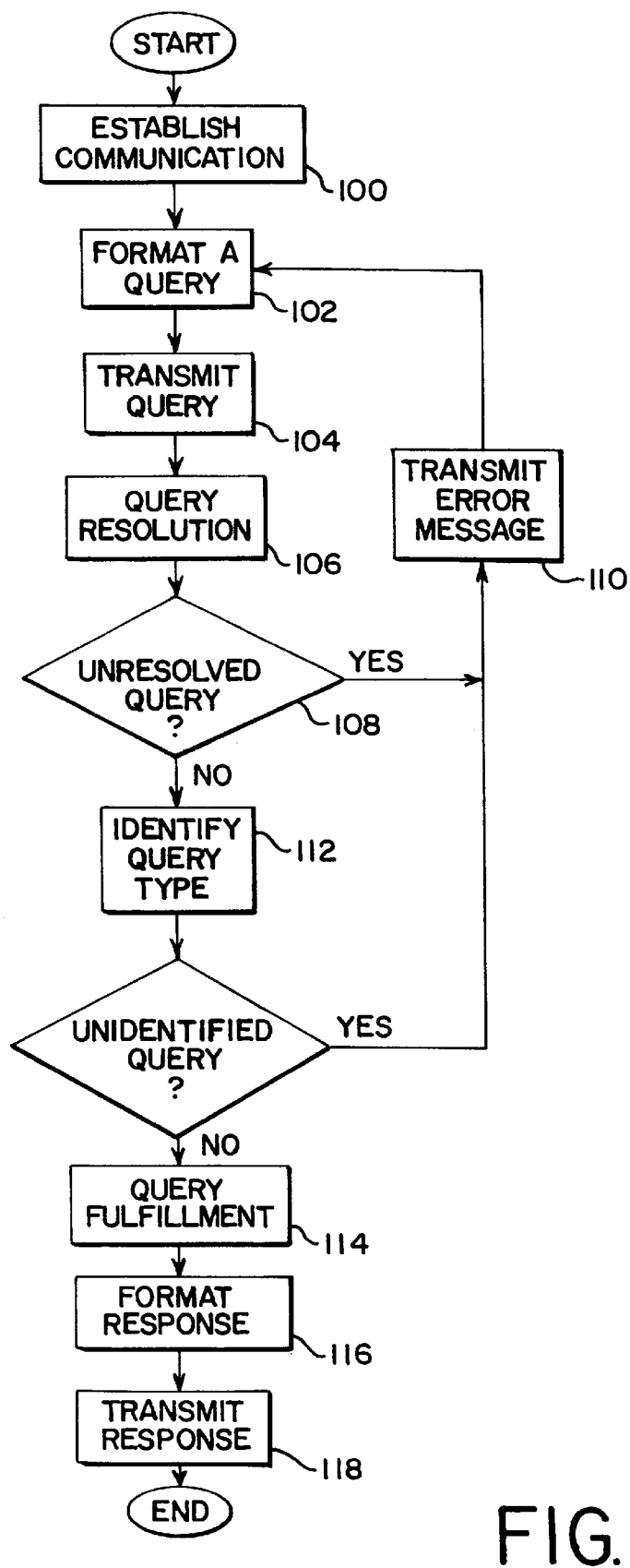
FIG. 2 is a flow diagram illustrating the method of the invention.

FIG. 2 is a flow diagram illustrating the method of the invention. The method begins at step 100 where communication is established between the mobile unit and the base unit 12. Performance of this step is largely dependent on the specific hardware implementation of both the base unit 12 and the mobile unit. For example, with reference to FIG. 1, the desktop personal computer 16 would establish communications using the modem 22 to place a telephone call over the telephone line 24 to the base unit 12. The telephone interface 74 of the base unit 12 and the modem 22 would establish communication in a manner well known in the art. Similarly, the laptop personal computer 18 would establish communications with the base unit 12 by completing a telephone call through the cellular telephone system 38.

The system and method of the invention are independent of the particular hardware and communication channels in which the invention is implemented.

The method continues at step 102, in which a query is formatted at the remote unit. The query is formatted in accordance with the protocol of the invention, to be described in further detail in conjunction with FIG. 3.

The query comprises a serial stream of data and control bits. The control bits, for example, identify the remote user originating the query. The data bits specify the precise request being made of the base unit. For example, the data bits may specify an origin point and a destination point, from which the route calculator 66 (FIG. 1) of the base unit 12 is to calculate the route. Certain communications transport protocols, specific to the particular hardware implementation of the system 10, may prepend or append characters or other control bits to the control and data bits which form the query. For example, the modem 22 of the desktop PC 16 may include handshaking bits or signals to be used by the telephone interface 74 of the base unit 12 for processing the query. At step 104, the query is transmitted from the mobile unit to the base unit 12.

The method continues at step 106, where ambiguities in the query are resolved by the query resolver 64 (FIG. 1). Ambiguities may be in the form of spelling errors in the identification of an origin or a destination, an inconsistent latitude or longitude specification, etc. At step 108, if the query resolver 64 cannot resolve the ambiguity, an error message may be communicated from the base unit to the remote unit at step 110, and the query must be repeated.

The method continues at step 112, where the query type is identified. The query may be one of several different types, including a route query, a point of interest query, a language query, or a metro area query. A route query asks the base unit 12 to identify a route between a specified origin point and a specified destination point. A route query includes the origin and the destination. A point of interest query requests a list of points of interest which satisfy specified criteria. For example, a point of interest query might request a list of all restaurants of a specific type, such as McDonald's™, within a specified distance or a specified driving time of a specified origin. A language query requests a list of available languages for display of information at the mobile unit or specifies the language (such as English or Dutch) in which the routing information is to be displayed at the remote unit. A metro area query requests a list of available metropolitan areas or specifies the metropolitan area within the map database 72 (FIG. 1) to be used for responding to the query. For example, a query which has as its origin "77 W. Chestnut Street" in Chicago must specify the Chicago metropolitan area rather than, for example, the Cincinnati metropolitan area, in order to prevent confusion. If a query cannot be identified, an error message is generated at step 110 and the query must be repeated. After the query type has been determined at step 112, the query can be routed to the route calculator 66, the distance and travel estimator 68 or the surroundings explorer 70 (FIG. 1) for processing.

The method continues at step 114, where the query is fulfilled. For example, if the query requested routing information between an origin and a destination, the route calculator 66, operating in conjunction with the map database 72, calculates a route between the origin and the destination. Similarly, if the query was a point of interest query, the surroundings explorer 70 will determine points of interest which satisfy the query.

The method continues at step 116, where the response to the query is formatted. The response is formatted in accordance with a data communications protocol to be described in detail in conjunction with FIG. 4. The formatted response includes control and data bits. The control bits specify information such as the mobile unit which initiated the request. The data bits specify the information, such as route guidance information, which fulfills the query. At step 118, the method concludes when the response is transmitted from the base unit 12 to the mobile unit.

Referring now to FIG. 3, it is a diagram illustrating a data communication protocol for communicating data from a mobile unit to a base unit in accordance with the invention and which may be used in conjunction with the system of FIG. 1 and the method of FIG. 2. The protocol illustrated in FIG. 3 is defined by a communications syntax including variable message lengths, allowing as little or as much data transfer as necessary for the specific application requirement. The protocol can be used across all communications systems, as long as the printable, seven-bit ASCII character set, plus the "newline" character (0x0A) can be transmitted by the communications system.

The transmitted character set consists of the principal ASCII character set plus the newline character. To transmit bytes of data which do not fit in this character set, or for communication protocols which do not allow transmission of the newline character, an escape mechanism may be provided to allow transmission of these characters. For communication in binary format, numeric fields or numeric values are transmitted using two's complement notation, in network byte order (most significant byte first, followed by decreasing significance bytes). Floating point numbers are transmitted using IEEE 64-bit double precision format, with the most significant byte transmitted first.

Only a single query message 120 is needed to transmit a query from a mobile unit to the base unit 12.

This query message 120 provides for both current location tracking information as well as route calculation requests. The query message 120 includes a plurality of fields 122. Each field of the plurality 122 of fields is separated by a delimiter,. preferably the vertical bar "|" (ASCII code 0x7C). The start of the query message 120 begins with a delimiter character.

The end of each message is marked by a delimiter character immediately followed by a newline character (ASCII code 0x0A), represented in FIGS. 3 and 4 as "\n".

Any characters between the ending newline character and the starting delimiter are preferably ignored by the base unit 10 and the mobile unit.

As noted, the query message 120 includes a plurality of fields 122. Some communications transport protocols may prepend or append characters for controlling communication of the message in accordance with the specific hardware implementation of the system 10.

The query message 120 includes a message length field 124. This field specifies the length of the query message 120. The message length field 124 may also include a compression marker 125 indicating the compression status of the message. For example, the compression marker 125 may take on a first value if the query message 120 is compressed using a current phrase compression table. The compression marker 125 may take on a second value if the query message 120 is compressed using the current dictionary (bit compression) table. The compression marker 125 may take on a third value if the query message 120 is compressed using the L-Z (Lev-Zempel) compression algorithm. And the compression marker 125 may take on a fourth value or simply not be present if the query message 120 is not compressed in any way.

The query message 120 further includes a CRC (cyclical redundancy check) field 126. This value is preferably the computed CRC-16 of the query message 120, starting with the delimiter following the CRC field 126 up to and including the ending newline, as actually transmitted (i.e., as compressed). The query message 120 further includes a time stamp field 128 which gives the number of seconds since the epoch (00:00:00 GMT Jan. 1, 1970) when this message was sent. Preferably, messages older than 20 minutes will be ignored when received by the base unit 12.

The query message 120 further includes a subscriber identifier field 130. The information provided in this field may be used for billing and audit information. The query message 120 further includes a message identifier field 132. The characters in this field are used to tag response messages transmitted from the base unit 10 to the requesting mobile unit. The base unit 12 will place the characters in the message ID field 132 in any return message so that the mobile unit may determine what original message the base unit 12 is responding to.

The query message 120 further includes an identifier field 134, which provides identification information uniquely identifying the mobile unit which transmitted the query message 120. The identification field 134 is used for tracking and communications addressing.

The query message 120 further includes a latitude field 136 and a longitude field 138. These fields specify the current position of the mobile unit latitude and longitude, respectively. By default, the current latitude and longitude provide the origin for all routing requests, and also provide the position used for default tracking address translation.

The query message 120 further includes an origin field 140. The origin field 140 specifies the origin address for a routing information request. If this field is empty, the current position specified by the latitude field 136 and the longitude field 138 is used as the origin address. The query message 120 further includes an origin type field 142, which may be either an address or a point of interest category (such as "restaurant," "museum" or "airport") which is recognizable by the base unit 12.

The query message 120 further includes a destination field 144, which specifies the destination address if routing information is requested by the mobile unit from the base unit 12. If the destination field 144 is empty, then no route is calculated by the base unit 12. Instead, the message 120 is considered to be a tracking message only, merely providing the location of the mobile unit.

The query message 120 further includes a destination type field 146 which specifies the type of destination. For example, the destination may be an address or a point of interest category recognizable by the base unit 12. For example, the point of interest categories may include "restaurants", "airport", or "museum." As one example, the destination type field 146 may be "restaurant," and the destination field 144 may be "McDonald's™."

The query message 120 further includes a destination limit field 148. This field specifies a limit for point of interest searches. Such a search will be limited to the range specified by the value in the destination limit field 148 about the origin. For example, if the destination limit field 148 is empty or has a value 0, the base unit 12 preferably interprets this to indicate that the nearest point of interest satisfying the requirements specified by the destination field 144 and the destination type field 146 should be located. If the destination limit field 148 is non-zero, then the limit specified sets the maximum range searched for a matching point of interest. If no matching point of interest is in the range specified, a "no match" route error is returned.

The value of the destination limit specified in the destination limit field 148 depends on the limit type field 150. The limit type field 150 determines what unit of measurement is in the destination limit field. For example, the limit type field may take on a first value when the destination limit specifies a straight line distance. The limit type field 150 may take on a second value when the destination limit is driving distance. Or, the limit type field 150 may take on a third value when the destination limit is driving time, in minutes.

The query message 120 concludes with an ending field 152. The ending field 152 preferably includes the newline character, represented in FIG. 3 as "\n."

Before the ending field 152, the query message 120 may also include additional fields which specify additional information or service requests from the mobile unit to the base unit 12. For example, the query message 120 may additionally specify a text message to an operator of the base unit 12, or specify whether the base unit 12 should provide maneuver arms information with the return route guidance text. Maneuver arms information is the geographical representation of intersections along the route determined by the base unit 12. Further, the query message 120 could additionally specify routing options such as route calculations which avoid tolls, avoid left turns or avoid limited access roads, or specify a time of day for the start of the route. Still further, the message 120 could optionally request additional information from the base unit 12, such as a list of point of interest types, a list of points of interest matching search criteria or a list of files which may be communicated from the base unit 12 to the mobile unit to provide descriptive information.

Referring now to FIG. 4, it illustrates a data communications protocol for communicating data from a base unit to a mobile unit in accordance with the invention and which may be used in conjunction with the system of FIG. 1 and the method of FIG. 2. In FIG. 4, a response message 160 is illustrated as including a plurality of fields 162.

In accordance with the invention, the response message 160 may be transmitted in a continuous stream of data, known as burst mode, or in a plurality of discrete responses to queries for data, known as normal mode.

The mode of data transmission may be specified by the mobile unit, for example, in an additional field included in the query message 120. In burst mode, the base unit 12 will transmit data as fast as possible, without waiting for requests from the mobile unit. In normal mode, the base unit 12 sends a packet, then waits for the mobile unit to request the next packet before sending the next packet.

Further in accordance with the invention, the response transmitted from the base unit 10 to a mobile unit may include maneuver arms information. Maneuver arms are graphical vectors used by the mobile unit for displaying a graphical representation of an intersection to be traversed. Three types of visual information are transmitted by the base unit. These include a geometric representation of the intersection, including vectors defining the streets approaching an intersection and the angles at which the streets approach the intersection. The transmitted information further includes which of the streets is included in the route to be travelled so that, for example, that street may be highlighted in a graphical display. The transmitted information further includes information about street signs located at the intersection.

Preferably, the maneuver arms information includes only sufficient data to create a display showing only what the driver of a vehicle containing the mobile unit will see as the driver traverses the displayed intersection. Other, extraneous information, such as a map of the region around the intersection or of the entire metropolitan region, is not transmitted.

Transmitting only a representation of intersections to be traversed, rather than extraneous information, greatly reduces data transmission and storage requirements. Thus, a relatively low bandwidth channel may be used for transmitting queries and responses between the base unit 10 and the mobile unit. For example, a channel having a bandwidth as low as 1,200 bits per second may be used. In contrast, transmitting extraneous information may require a bandwidth as high as 1 megabit per second. Since the amount of data transmitted is relatively small, the entire response, including maneuver arms information, may be transmitted in a reasonable time, even at a low bandwidth. In addition, since only pertinent information about intersections is transmitted, only a small amount of memory, such as memory 26 of the desktop personal computer 16 (FIG. 1) is required at the mobile unit.

After an intersection has been traversed, the display is preferably updated to show the next intersection to be traversed, using maneuver arms information received from the base unit and stored in memory. The display may be updated in response to operator control, for example, by operating a switch or by voice control, or automatically in response to a position sensor such as the position locator 42 of the laptop personal computer 18 (FIG. 1).

The response message 160 preferably includes a message length field 164 which specifies the length of the response message 160. In addition, the message length field 164 may include a compression marker character 165. The compression marker character 165 may take on one of a number of values. For example, the compression marker character 165 may take on a first value if the response message 160 is compressed using the current phrase compression table. The compression marker character 165 may take on a second value if the response message 160 is compressed using the current dictionary (bit compression) table. The compression marker character 165 may take on a third value if the response message 160 is compressed according to the L-Z (Lev-Zempel) compression algorithm. The compression marker character 165 may take on a fourth value or simply not be present if the response message 160 is not compressed in any way.

The response message 160 further includes a CRC field 166 which is preferably the computed CRC-16 of the message 160, starting with the delimiter following the CRC field 166 up to and including the ending character of the message 160. The response message 160 further includes a time stamp field 168 which specifies the number of seconds since the epoch (00:00:00 GMT Jan. 1, 1970) when this message was sent. Preferably, messages older than 20 minutes will be ignored by the mobile unit which receives the message.

The response message 160 further includes a subscriber identifier field 170. This field preferably specifies information used for auditing, billing and authorization.

The response message 160 further includes a message identification field 172. In accordance with the invention, the contents of the message identification field 170 of the response message 160 match the contents of the message ID field 132 of the query message 120. The response message 160 further includes an identifier field 174. Preferably, the contents of the identifier field 174 of the response message 160 match the contents of the identifier field 134 of the query message 120.

The response message 160 further includes a type field 176 and message field 178. The type field 176 specifies the type of the message contained in the message field 178. For example, the type field 176 may have a first value specifying that the message field 178 contains route tracking address translation information.

Such a message would result from the base unit 12 having received a route tracking query. The message in the message field 178 is then the address corresponding to the current position (latitude, longitude). The type field 176 may have a second value specifying that the message field 178 includes route guidance information. This message would result from the base unit 12 having received a route calculation request. The message is the set of driving instructions. The instructions will contain several lines of text, each separated by carriage return/newline characters. There may be several messages of this type communicated for a single route. Each message will correspond to a single maneuver if arms are requested, or be the complete text if arms are not requested.

The message type field 176 may take on a third value to indicate that the message field 178 contains a download of information. This message would result from a query requesting particular information from the base unit 12. The type field 176 may take on a fourth value to indicate that the message field 178 contains an error message. For example, the latitude and longitude specified by the latitude field 136 and the longitude field 138 in the query message may be outside the specified metropolitan region, or the specified address may be invalid or not found for a route calculation. The message field 178 contains the error text defining the error.

The type field 176 may take on a fifth value to specify that the message field 178 contains a query response. Such a message would be the result of a query made of the database, for example requesting a list of point of interest types. The message field 178 includes the query data.

The response message 160 concludes with an ending field 180. Preferably, the ending field 180 includes the newline character, illustrated in FIG. 4 as "\n".

As can be seen from the foregoing, the invention provides a system and method for providing graphically referenced information from a base unit or server to a mobile unit. The invention allows the mobile unit to operate in response to only a small user interface program with no database storage or position sensor requirement. Software for controlling the mobile unit runs on generic hand-held devices or desktop computers with wireless or wireline communications capability. A query, communicated from the mobile unit to the base unit, and the response, communicated from the base unit to the mobile unit, are packaged into a standard data communications protocol that manages a broad spectrum of queries and responses available. This approach to providing route guidance information allows automatic real time database updates and corrections at the base unit, avoiding database distribution problems. In addition, the cost and technical requirements of the on-board or mobile unit equipment are substantially lower than for prior art route guidance information systems.

It is to be understood that, while the detailed drawings and specific examples given describe preferred embodiments of the invention, they are for the purpose of illustration only, that the apparatus of the invention is not limited to the precise details and conditions disclosed, and various changes may be made therein. For example, the format or protocol of the query message and the response message, illustrated in FIGS. 3 and 4, respectively, may be modified to request different types of information from the map database or to specify different formats or subsets of information to be conveyed to the mobile unit. Such changes may be made without departing from the spirit of the invention which is defined by the following claims.

What is claimed is:

1. A method of providing navigation information from a base unit to a plurality of remote units, including a plurality of mobile units each of which communicates with the base unit via a wireless communication link, the method comprising the steps of:

from said plurality of remote units, formatting query messages requesting navigation services, wherein said query messages are formatted according to a protocol specifying an arrangement of data bits and control bits, and further wherein each query message includes a plurality of fields, including a subscriber identifier field, a query message identifier field, and at least one more field specifying a request for navigation information services, wherein data included in each subscriber identifier field of each query message uniquely identify which of said plurality of remote units formatted the message of which the subscriber identifier field is a part, and wherein said query message identifier field uniquely identifies the query message of which said message identifier field is a part;

from each of said plurality of remote units, transmitting said formatted query messages to the base unit;

at said base unit, receiving each of said query messages;

at said base unit, with respect to each of said query messages that requests a navigation information service, formatting a reply message, wherein each reply message is formatted according to a protocol specifying an arrangement of data bits and control bits, and further wherein each reply message includes a plurality of fields, including a field that contains navigation information that fulfills said request for service in the query message to which said reply message is in response; and from said base unit, transmitting each of said reply messages to the remote units of said plurality of remote units, from which respective query messages were sent.

2. The invention of claim 1 further comprising the step of:

at said base unit, prior to the step of formatting a reply message, with respect to each of said query messages, analyzing each of said query messages for ambiguities; and resolving ambiguities, if any, in each of said query messages.

3. The invention of claim 1 wherein at least some of said query messages include a compression marker field, wherein the compression marker field includes data specifying a compression method, if any, used in the query message of which said compression marker field is a part.

4. The invention of claim 3 wherein compression methods that can be specified by the compression marker field include LZ compression and current-dictionary-bit-compression.

5. The invention of claim 1 wherein at least some of said query messages include a time stamp field, wherein said time stamp field includes data specifying the time at which the query message of which said time stamp field is a part was sent.

6. The invention of claim 1 wherein at least some of said query messages include a destination limit field, wherein said destination limit field includes data specifying a limit for point of interest searches associated with the query message of which said destination limit field is a part.

7. The invention of claim 1 wherein each query message includes a message length field that includes data specifying the length of the query message of which said message length field is a part.

8. The invention of claim 1 wherein each query message includes a cyclical redundancy check field that includes data specifying the computed cyclical redundancy of the query message of which said cyclical redundancy check field is a part.

9. The invention of claim 1 wherein each reply message includes a message length field that includes data specifying the length of the reply message of which said message length field is a part.

10. The invention of claim 1 wherein each reply message includes a cyclical redundancy check field that includes data specifying the computed cyclical redundancy of the reply message of which said cyclical redundancy check field is a part.

11. The invention of claim 1 wherein at least some of said reply messages include a compression marker field, wherein the compression marker field includes data specifying a compression method, if any, used in the reply message of which said compression marker field is a part.

12. The invention of claim 1 wherein at least some of said reply messages include a time stamp field, wherein said time stamp field includes data specifying the time at which the reply message of which said time stamp field is a part was sent.

13. The invention of claim 1 wherein at least some of said reply messages include a type field and a message field, wherein said type field of a reply message includes data specifying a type of message included in the message field of said reply message.

14. The invention of claim 1 wherein said step of formatting a reply message further comprises the step of:

including in a subscriber identifier field of said reply message, the data included the subscriber identifier field of the query message to which said reply message is in response.

15. The invention of claim 1 wherein said step of formatting a reply message further comprises the step of:

including in a message identifier field of said reply message, the data included the message identifier field of the query message to which said reply message is in response.

* * * * *